May 31, 1955   F. A. STIRRUP   2,709,550
RADIATOR VALVES
Filed Dec. 28, 1951
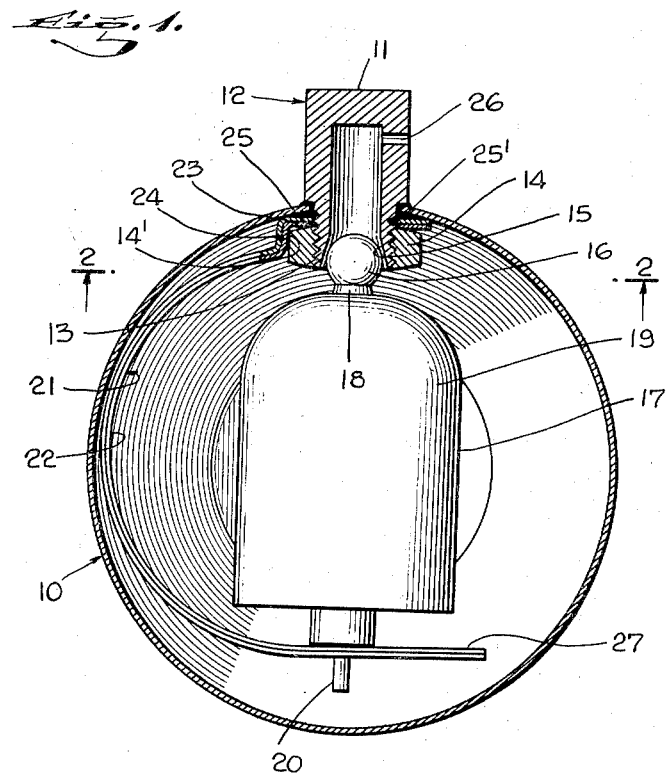
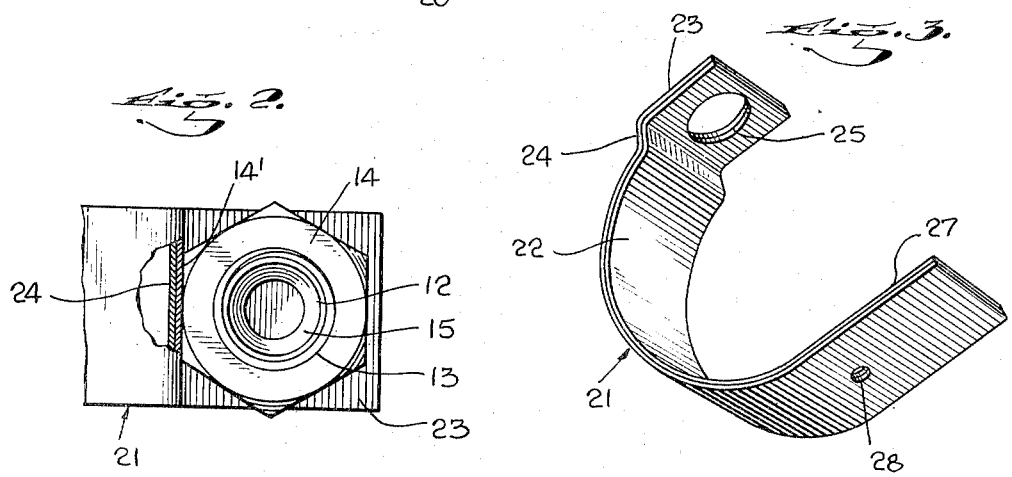
INVENTOR
FRANK A. STIRRUP
BY
ATTORNEY

United States Patent Office 2,709,550
Patented May 31, 1955

2,709,550

RADIATOR VALVES

Frank A. Stirrup, Plainfield, N. J., assignor to Gorton Heating Corporation, Cranford, N. J., a corporation of New York Application December 28, 1951, Serial No. 263,863

1 Claim. (Cl. 236—62)

This invention relates to radiator valves and, particularly, devices of this type and kind of the vapor equalizing and air eliminating type to provide a definite control of heat distribution throughout a series of rooms controlled by a heating system. More particularly, the invention deals with a novel structure in the bi-metal element employed, wherein the major portion of the element is freely suspended within the valve casing and, further, wherein a shouldered mounting end portion of the element serves as means for keying a coupling nut against rotation in the assemblage of the device.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is an enlarged sectional view through a valve made according to my invention showing the valve member in open position.

Fig. 2 is a partial section on the line 2—2 of Fig. 1 with part of the construction broken away; and Fig. 3 is a perspective view of the bi-metal element, detached.

In the accompanying drawing, I have illustrated in Fig. 1 a radiator valve casing 10 having, at its upper end, a thimble-shaped discharge member 11. The downwardly extending sleeve portion 12 of the member is externally threaded, as seen at 13, to receive a coupling or mounting nut 14. The bore of the sleeve portion 12 has, at its lower end, a bevelled seat 15, in connection with which a ball or rounded end 16 of a control valve 17 operates.

The valve 17 has a stem portion 18, on which a bell-shaped casing 19 is fixed, the stem 18 projecting downwardly through the casing 19 and having a reduced pin end 20 at its lower end.

At 21 I have shown my improved bi-metal element controlling actuation of the valve 17. The bi-metal element 21 is shown in perspective in Fig. 3 and comprises a loop or semi-circular portion 22, having an offset rectangular end 23, the offset forming a key shoulder 24 extending at right angles to the end 23. The end 23 has an aperture 25 to receive the threaded end 13 of the sleeve 12, as will be apparent.

Considering Fig. 2 of the drawing, it will appear that one side surface 14' of the hexagon nut is adapted to bear upon the shoulder 24 of the element 21 to key the nut 14 against rotation in the operation of assembling the member 11 with the casing.

After the member has been secured clamped into position, the member 11 is sealed on the casing 10 by solder, as at 25', and the end 23 also serves to check the flow of solder into the casing.

The member 11 has a control discharge aperture 26, the size of which will govern the requirements of the particular installation. In other words, this hole is made larger or smaller, as the case may be.

Considering Fig. 1 of the drawing, it will be apparent that, by offsetting the element 21 to form the shoulder 24, this shoulder not only serves to key the nut 14 but also serves a more important purpose, namely to dispose the entire element 21 beyond its direct attachment with the casing through the square end 23 freely within the casing, thus producing a very sensitive control and operation of the element in movement of the valve 16 into open and closed positions. In Fig. 1, the valve 16 is shown in open position and, in movement of the valve into closed position, it will be apparent that the element 21 will move inwardly in the direction of the axis of the casing.

The element 21 has a long free end portion 27, substantially parallel to the end 23. This end portion 27 has, in vertical alinement with the aperture 25, an aperture or opening 28, providing free movement of the pin end 20 therein, thus maintaining a substantial vertical position of the valve stem 18 at all times.

By reason of the novel structure of the radiator valve herein disclosed, it will be apparent that the cost of production of the valve is materially reduced in simplifying the assemblage of the parts. Still further, a materially greater efficiency is provided by reason of the free mounting of the bi-metal element 21 in the valve casing. It will be understood that casings of the type and kind under consideration have means thereon for attaching the valve to a radiator but, as such means is well-known, no showing or description thereof is herein made.

Having fully described my invention, what I claim as new and desire to secure by Letters Patent is:

A valve of the character described, comprising a casing having an annular wall, a thimble-shaped valve seat member secured in said wall of the casing and projecting outwardly from the casing and into the casing, the inner portion of said member being externally threaded and having a conical seat, a nut mounted on the threaded portion of said member in coupling the member with the casing, a bi-metal element comprising an elongated strip, one end of the strip being flat and apertured to receive the threaded end portion of said member, said strip, adjacent the flat end, being offset to form a shoulder portion extending at right angles to said flat end and paralleling and engaging one side surface of said nut in keying the nut against rotation, said strip being of constant width throughout and substantially equal in width to the width of said nut, said offset shoulder portion being of a depth substantially equal to the thickness of said nut, said strip having a long straight end portion joining said offset shoulder in a substantially semi-circular portion arranged in the casing in spaced relation to the annular wall thereof, said last named long end portion having an aperture in alinement with the aperture in the flat end, a bell-type valve having a ball end arranged within and adapted to seat upon the conical seat of said member, and said valve having, at its lower end, a reduced stem operating in said last named aperture.

References Cited in the file of this patent

UNITED STATES PATENTS

| | | |
|---|---|---|
| 1,687,230 | Smith | Oct. 9, 1928 |
| 2,361,913 | Breese | Nov. 7, 1944 |
| 2,400,297 | Jacobus | May 14, 1946 |
| 2,494,293 | Gorton | Jan. 10, 1950 |